Dec. 23, 1924.　　　　　　　　　　　　　　　　1,520,448
E. A. SMITH
REVOLVING NUT DRYING TRAY
Filed Jan. 3, 1923
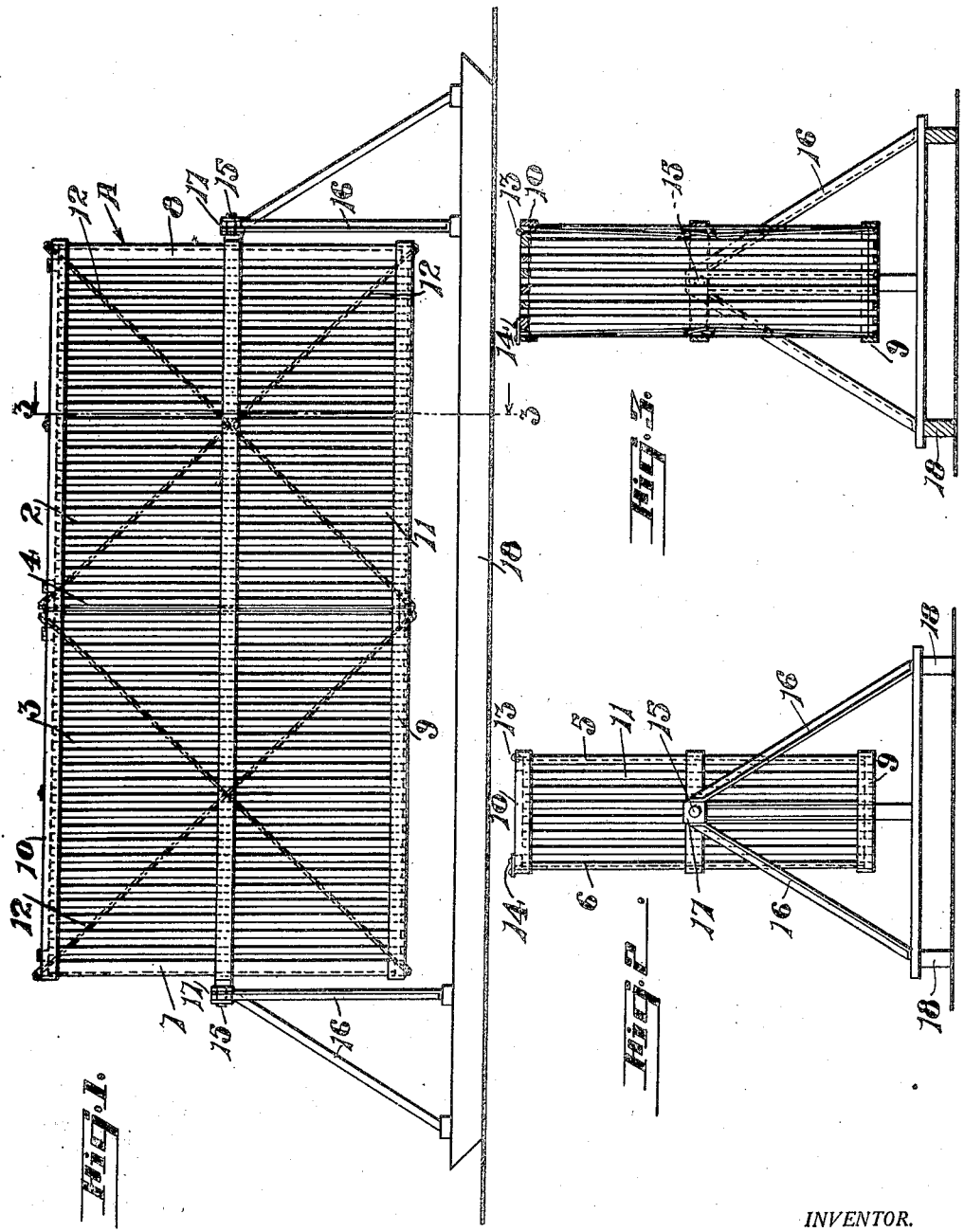
INVENTOR.
EDWIN A. SMITH.
BY Dewey, Strong
Townsend & Loftus
ATTORNEYS.

Patented Dec. 23, 1924.

1,520,448

UNITED STATES PATENT OFFICE.

EDWIN A. SMITH, OF CONCORD, CALIFORNIA.

REVOLVING NUT-DRYING TRAY.

Application filed January 3, 1923. Serial No. 610,431.

*To all whom it may concern:*

Be it known that I, EDWIN A. SMITH, citizen of the United States, residing at Concord, county of Contra Costa, and State of California, have invented new and useful Improvements in a Revolving Nut-Drying Tray, of which the following is a specification.

This invention relates to a drying tray and especially to a rotatable type of tray adapted for drying nuts and like products.

When drying fruits and like products, and particularly walnuts, the nuts when picked from the trees or shaken therefrom are placed upon trays resting upon the ground and after the fruits have been dried and cured upon one side, they are turned so as to expose the other side to the sun, whereby the drying process is completed. The nuts may be turned by hand or the entire tray may be turned over, either operation being laborious and consuming considerable time. It is common practice to place an empty tray over the tray supporting the nuts and then turning the trays in unison by grasping the opposite ends. The nuts are thus all reversed by one operation and the nuts are at the same time transferred from one tray to the other. This method of turning the trays requires two persons and is not only laborious and time consuming, but it also requires a great number of trays and considerable space. The present invention is designed to dispense with one person and to materially lessen the labor of the other, and also to so design the trays that they may be readily turned by a single individual with great ease and rapidity.

The improved tray consists of a rectangular shaped casing composed of interspaced slats. These slats permit circulation of wind and air and exposure to sunlight, and as the casings may be constructed of any capacity desired, it is obvious that they may contain the equivalent of a great number of trays. The casings are furthermore centrally supported and pivoted, and as such may be readily and quickly turned as many times a day as desired. Another improvement consists in placing the casings on a frame structure supported by skids, thus permitting the casings to be pulled in under cover in case of unreliable weather and to be readily moved out into the sunshine when desired.

One form which my invention may assume is exemplified in the following description and illustrated in the accompanying drawings, in which—

Fig. 1 is a side elevation of the drying tray showing the frame and the skids by which it is supported.

Fig. 2 is an end view of Fig. 1.

Fig. 3 is a central, vertical cross section taken on line 3—3, Fig. 1.

Referring to the drawings in detail, A indicates in general a drying tray, which is divided into two compartments generally indicated at 2 and 3 by means of a central partition member 4. The tray consists of side sections 5 and 6, end sections 7 and 8, a bottom section 9, and two cover sections 10, one for each compartment. The sides, ends, bottom and covers consist of wooden slats 11, which are nailed or otherwise secured to an interior frame support. These slats are interspaced to permit free circulation of wind and air and exposure to sunlight, and the structure as a whole is otherwise braced by means of tie rods such as indicated at 12. The cover sections are hingedly secured in one side as indicated at 13 and may be secured by a latch or the like as at 14 when closed. The tray is centrally supported by means of a shaft or tubing 15, which extends longitudinally through the tray. This tube is supported in a pair of end frames 16 and it is journalled in the upper ends thereof as indicated at 17. The tray is thus freely turnable and can therefore be readily turned by a single operation whenever and as often as desired.

The drying tray is preferably portable in construction and is for this reason supported by a pair of longitudinally extending skid members 18. It may, however, be placed on trucks or the like if desired as it should be so arranged that it may be readily moved in under cover in case of inclement weather.

In actual operation the tray is filled with nuts in any suitable manner by opening the cover sections 10. The trays are then permitted to stand in the vertical position shown and may so remain for any length of time desired. Wind and air will thus be permitted to freely circulate and a certain proportion of the nuts will also be exposed to the sunshine. However to obtain a uniform drying, it is advisable to turn the tray one or more revolutions at least once a day as this changes the position of the nuts and turns the same. The trays are again permitted to remain in a stationary position until further drying takes place, and the operation may be repeated and repeated until the desired result is obtained. The trays are then finally turned with the cover sections down and each compartment may then be emptied by merely opening the cover sections as the nuts will fall out by gravity. The nuts may of course be dumped into bins or other receptacles suitable for that purpose.

In the present instance I have described the device as being particularly useful for walnuts. I however wish it understood that it may be employed for a variety of purposes, and should therefore not be limited to this particular use. I further wish it understood that various changes in form and proportion may be resorted to within the scope of the appended claims, similarly that the materials and finish of the several parts employed may be such as the experience and judgment of the manufacturer may dictate or various uses may demand.

Having thus described my invention, what I claim and desire to secure by Letters Patent is—

1. A device of the character described comprising a rectangular shaped container consisting of side sections, end sections, a bottom section and a cover section, all of said sections being constructed of foraminous material, end frame members, a shaft journaled in said end frame members and extending longitudinally through the container and centrally thereof whereby the contents of the container may be exposed to the sun and air periodically through the cover section, the bottom section, or either of the side sections, and whereby the cover section may be positioned to permit discharge of the contents directly beneath the container.

2. A device of the character descried, comprising skid members, a pair of end frame members mounted on the skid members, a container disposed between the end frame members and consisting of side sections, end sections, a bottom section, and a cover section, all of said sections being constructed of foraminous material, a shaft journaled in said end frame members and extending longitudinally through the container and centrally thereof whereby upon a turning movement of the shaft, the container may be rotated step by step to expose the contents of the container interchangeably through the cover section, the bottom section or either of the side sections, and whereby the cover section may be positioned for opening to effect discharge of the contents of the container immediately beneath the container and whereby the container may be moved from place to place on said skid members.

3. A device of the character described, comprising a rectangular shaped frame consisting of side sections, end sections, and a bottom section, a central partition in the container dividing the same into two separate compartments, a cover section for each compartment hingedly connected to the container, means for securing each cover when closed, the side sections, the end sections, the bottom section and the cover sections being composed of foraminous material, a pair of end frame members, a shaft journaled in said end frame members and extending centrally through the compartments of the container and to which shaft the container is secured and whereby the container may be rotated step by step so as to expose the contents of the compartments of the container to the sun, air and wind, and whereby the cover sections may be turned to a position whereby to effect discharge of the contents of the compartments immediately beneath the container.

EDWIN A. SMITH.